(12) United States Patent
Cassel (10) Patent No.: US 10,911,414 B2
(45) Date of Patent: Feb. 2, 2021

(54) METHOD AND APPARATUS FOR DATA CONNECTIVITY SHARING

(71) Applicant: Telefonaktiebolaget LM Ericsson (publ), Stockholm (SE)

(72) Inventor: Joel Cassel, Rödeby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/391,490

(22) Filed: Apr. 23, 2019

(65) Prior Publication Data
US 2019/0253397 A1    Aug. 15, 2019

Related U.S. Application Data

(62) Division of application No. 15/102,047, filed as application No. PCT/SE2013/051474 on Dec. 9, 2013, now Pat. No. 10,320,755.

(51) Int. Cl.
*H04L 29/06* (2006.01)
*H04W 76/12* (2018.01)
(Continued)

(52) U.S. Cl.
CPC ......... *H04L 63/0428* (2013.01); *G06Q 20/40* (2013.01); *G06Q 30/00* (2013.01);
(Continued)

(58) Field of Classification Search
CPC .................................................. H04L 63/0428
See application file for complete search history.

(56) References Cited

U.S. PATENT DOCUMENTS 9,703,838 B1 * 7/2017 Hampson .......... G06F 16/24578
2004/0158741 A1 * 8/2004 Schneider ............. G06F 21/562
726/24
(Continued)

FOREIGN PATENT DOCUMENTS

WO    WO 2010/093831 A1    8/2010

OTHER PUBLICATIONS

International Search Report, Application No. PCT/SE2013/051474, dated Aug. 18, 2014.
(Continued)

*Primary Examiner* — Simon P Kanaan
(74) *Attorney, Agent, or Firm* — Sage Patent Group (57) ABSTRACT

A node enables sharing data connectivity between a consumer device and a broker device, and receives from a first packet routing node a request for a consumer authorization certificate. The request includes a subscriber identity. Based on the subscriber identity authorizing the subscriber for sharing data connectivity; a consumer authorization certificate is generated using a private encryption key associated with the node. The consumer authorization certificate includes the subscriber identity of the subscriber. The consumer authorization certificate is returned to the first packet routing node. A request for a data connectivity service for the subscriber is received from a second packet routing node. The request includes a consumer agreement certificate and a broker identity. The consumer agreement certificate is signed using a private key associated with the subscriber and includes the subscriber identity. The consumer agreement certificate is valued. A confirmation message is sent to the second packet routing node.

14 Claims, 7 Drawing Sheets

(51) Int. Cl.

| | |
|---|---|
| *H04W 76/11* | (2018.01) |
| *G06Q 20/40* | (2012.01) |
| *G06Q 30/00* | (2012.01) |
| *H04W 12/04* | (2021.01) |
| *H04W 12/08* | (2021.01) |
| *H04L 29/08* | (2006.01) |
| *H04L 9/32* | (2006.01) |
| *H04W 4/24* | (2018.01) |
| *H04L 12/14* | (2006.01) |
| *H04W 40/24* | (2009.01) |
| *H04W 84/18* | (2009.01) |
| *H04W 88/06* | (2009.01) |
| *H04W 12/00* | (2021.01) |

(52) U.S. Cl.
 CPC ........ *H04L 9/3263* (2013.01); *H04L 12/1457* (2013.01); *H04L 63/0823* (2013.01); *H04L 67/02* (2013.01); *H04L 67/04* (2013.01); *H04L 67/125* (2013.01); *H04L 67/2809* (2013.01); *H04W 4/24* (2013.01); *H04W 12/04* (2013.01); *H04W 12/08* (2013.01); *H04W 40/248* (2013.01); *H04W 76/11* (2018.02); *H04W 76/12* (2018.02); *H04L 2209/64* (2013.01); *H04W 12/00403* (2019.01); *H04W 12/00514* (2019.01); *H04W 84/18* (2013.01); *H04W 88/06* (2013.01)

(56) References Cited

U.S. PATENT DOCUMENTS

| | | |
|---|---|---|
| 2004/0250060 A1 | 12/2004 | Diep et al. |
| 2006/0224470 A1* | 10/2006 | Garcia Ruano .... G06Q 30/0601 705/26.1 |
| 2008/0271132 A1 | 10/2008 | Jokela et al. |
| 2009/0103501 A1 | 4/2009 | Farrag et al. |
| 2011/0126014 A1* | 5/2011 | Camp, Jr. ........... H04W 12/003 713/171 |
| 2011/0270722 A1 | 11/2011 | Cai et al. |
| 2011/0320622 A1 | 12/2011 | Cutler et al. |
| 2012/0120934 A1 | 5/2012 | Cho |
| 2012/0158595 A1 | 6/2012 | Cassel |
| 2012/0166806 A1* | 6/2012 | Zhang .................. H04L 9/0847 713/176 |
| 2012/0264375 A1 | 10/2012 | Shankaranarayanan |
| 2012/0265898 A1 | 10/2012 | Kruglick |
| 2016/0308843 A1* | 10/2016 | Cassel .................... G06Q 20/40 |

OTHER PUBLICATIONS

Written Opinion of the International Searching Authority, Application No. PCT/SE2013/051474, dated Aug. 18, 2014.
Communication pursuant to Article 94(3) EPC, European Patent Application No. 13 899 221.9, dated Apr. 26, 2018, 6 pages.
Communication with Supplementary European Search Report, EP Application No. 13899221.9, dated Aug. 5, 2016.

* cited by examiner

METHOD AND APPARATUS FOR DATA CONNECTIVITY SHARING

CROSS REFERENCE TO RELATED APPLICATIONS

This application is divisional application of U.S. application Ser. No. 15/102,047, filed on Jun. 6, 2016, which is a 35 U.S.C. § 371 national stage application of PCT International Application No. PCT/SE2013/051474, filed on Dec. 9, 2013, the disclosures and contents of which are incorporated by reference herein in their entirety. The above-referenced PCT International Application was published in the English language as International Publication No. WO 2015/088402 A1 on Jun. 18, 2015.

TECHNICAL FIELD

The present solution relates to a method and apparatus for data connectivity sharing.

BACKGROUND

Often when new generations of communication technologies are introduced the availability of user equipment such as handsets supporting these technologies is an obstacle for the usage of the new services already deployed in infrastructure of the communication network.

For example, the uptake of fourth generation (4G) handsets such as Long Term Evolution (LTE) is expected to be slower than the availability of services requiring a stable and high speed access. In the first few years of 4G network availability only a minority of the population will have handsets with technology that supports high-speed data access. A large supply of earlier generation, such as third generation (3G), handsets is expected to still be available to the market in the years to come. This is especially true for users in cost concerned markets not having the ability to purchase 4G handsets at the same pace as the communication networks are expanded.

Stability, performance, scalability and reliability issues exist in many of the current second generation (2G) and 3G networks. Streaming services such as Internet Protocol Television (IPTV), or reliable user experiences for other services are in need of the stability, but also the higher data speed offered by newer generation technology such as 4G. In many cases mobile network operators have opted to stop expanding and stabilizing their existing 3G bearer networks going directly towards 4G enabled networks.

In many cases any person with a smart phone can share their mobile internet access through an (ad-hoc) Wireless Area Network (WLAN), also referred to as Wi-Fi hotspot (sometimes called tethering).

Existing authentication techniques for connecting towards an ad-hoc Wi-Fi hotspot require some sort of handset authentication before a cost can be associated to the handset, as this is hidden behind a Wi-Fi Network Access Translation (NAT). This can be made in several ways such as prior registration, on the fly registration with username/password, credit-card registration, and previous certificate registration. More modern ways such as SIM Authentication for Wi-Fi is not readily available on all current mobile smartphones (although the standard is expanding).

A problem is that when network sharing is done the cost and quota consumption for data traffic will still be on the user sharing the Wi-Fi (the broker/enabler), rather than the user consuming the data traffic who is hidden behind the NAT.

Also, with respect to the consumer, mobile operators are left out of control for Wi-Fi tethering traffic. The mobile operators are not in control of the revenue stream from the consuming user when Wi-Fi is used and it is therefore not possible to dynamically alter the pricing or to give for example a return bonus to the user sharing its Wi-Fi.

SUMMARY

It is an object of the invention to provide methods and apparatuses for data connectivity sharing.

A first aspect of the invention relates to a method performed by a node, for enabling sharing data connectivity between a consumer device and a broker device, comprising the node performing the steps of:
  receiving from a first packet routing node a request for a consumer authorization certificate, the request including a subscriber identity;
  based on the subscriber identity authorizing the subscriber for sharing data connectivity;
  generating a consumer authorization certificate using a private encryption key associated with the node, said consumer authorization certificate including the subscriber identity of the subscriber;
  returning the consumer authorization certificate to the first packet routing node;
  receiving a request for a data connectivity service for the subscriber from a second packet routing node, the request comprising a consumer agreement certificate and a broker identity, said consumer agreement certificate signed using a private key associated with the subscriber and including the subscriber identity; validating the consumer agreement certificate; and
  sending a confirmation message to the second packet routing node.

The method may comprise charging an account associated with the subscriber identity and crediting an account associated with the broker identity for the data connectivity service.

The first packet routing node may be a GPRS Support Node and second packet routing node may be an EPC gateway.

The step of authorizing may further comprise determining a policy restriction.

A second aspect of the invention relates to a method performed by a broker application at a first communication device connected to a data network using a first access network for sharing data connectivity with a second communications device connected to the first communication device over an interconnect network, comprising the broker application performing the steps of:
  receiving a consumer agreement certificate over the interconnect network;
  determining a destination address for the consumer agreement certificate;
  sending the consumer agreement certificate to the destination address over the first access network;
  receiving a confirmation message including the communication path identifier identifying a communication path over the first access network; and
  in response to the confirmation message allowing data transmission between the data network and the second communications device using the identified communication path.

The method may comprise that the first access network and interconnect network uses different radio access technologies.

The method may further comprise that the first access network uses any one radio access technology of GSM, UMTS, EDGE, HSPA, LTE and the interconnect network uses any one access technology of WLAN, Bluetooth, ZigBee and IR.

The method may also comprise that, before the step of receiving the consumer agreement certificate a further steps of determining a broker fee and providing the broker fee to the second communications device over the interconnect network.

Further method, the communication path identifier may be an APN or a PDP Context.

A third aspect of the invention relates to a method performed by a consumer application at a first communication device connected to a data network using a first access network for sharing data connectivity with a second communications device connected to the first communication device over an interconnect network, comprising the consumer application performing the steps of:
  sending a request for a consumer authorization certificate to a first pack node over the first access network;
  —receiving the consumer authorization certificate from the first pack node over the first access network;
  identifying an available second communication device;
  —generating a consumer agreement certificate;
  sending the consumer agreement certificate to the second communication device over the interconnect network; and
  initiating data transmission between the first and second communications device over the interconnect network.

The method may comprise before the step of generating, performing the further step of retrieving a broker fee parameter from the second communication device; and including the broker fee in the consumer authorization certificate.

The method may also comprise that the first access network and interconnect network uses different radio access technologies.

Also, the method may comprise that the first access network uses any one radio access technology of GSM, UMTS, EDGE, HSPA, LTE and the interconnect network uses any one access technology of WLAN, Bluetooth, ZigBee and IR.

In one option the step of identifying an available second communication device comprises detecting a specific character set of a WLAN SSID thereby indicating data connectivity sharing enablement.

A fourth aspect of the invention relates node, for enabling sharing data connectivity between a consumer device and a broker device, comprising a processor and a memory, said memory containing instructions executable by said processor whereby said node is operative to:
  receive from a first packet routing node a request for a consumer authorization certificate, the request including a subscriber identity;
  based on the subscriber identity authorize the subscriber for sharing data connectivity;
  generate a consumer authorization certificate using a private encryption key associated with the node, said consumer authorization certificate including the subscriber identity of the subscriber;
  return the consumer authorization certificate to the first packet routing node; —receive a request for a data connectivity service for the subscriber from a second packet routing node, the request comprising a consumer agreement certificate and a broker identity, said consumer agreement certificate signed using a private key associated with the subscriber and including the subscriber identity;
  validate the consumer agreement certificate; —send a confirmation message to the second packet routing node.

In one embodiment the node comprises charging an account associated with the subscriber identity and crediting an account associated with the broker identity for the data connectivity service.

In another embodiment the first packet routing node is GPRS Support Node and second packet routing node is and EPC gateway.

In yet another embodiment the node is further adapted to determine a policy restriction.

A fifth aspect of the invention relates to a broker device comprising a processor and a memory, said memory containing instructions executable by said processor, the broker device connected to a data network using a first access network for sharing data connectivity with a consumer device connected to the first communication device over an interconnect network, whereby said broker device is operative to:
  receive a consumer agreement certificate over the interconnect network; —determine a destination address for the consumer agreement certificate;
  send the consumer agreement certificate to the destination address over the first access network;
  receive a confirmation message including the communication path identifier identifying a communication path over the first access network;
  in response to the confirmation message allow data transmission between the data network and the consumer device using the identified communication path.

In one embodiment the interconnect network uses different radio access technologies.

In a further embodiment the first access network uses any one radio access technology of GSM, UMTS, EDGE, HSPA, LTE and the interconnect network uses any one access technology of WLAN, Bluetooth, ZigBee and IR.

In yet another embodiment the broker application is further adapted to determine a broker fee and provide the broker fee to the second communications device over the interconnect network.

In a yet further embodiment the communication path identifier is an APN or a PDP Context.

A sixth aspect of the invention relates to a consumer device comprising a processor and a memory, said memory containing instructions executable by said processor, the consumer device connected to a data network using a first access network for sharing data connectivity with a broker device connected to the first communication device over an interconnect network, wherein the consumer application is operative to:
  send a request for a consumer authorization certificate to a first pack node over the first access network;
  receive the consumer authorization certificate from the first pack node over the first access network;
  identify an available broker device;
  generate a consumer agreement certificate;
  send the consumer agreement certificate to the broker device over the interconnect network; and
  initiate data transmission between the first and second communications device over the interconnect network.

In one embodiment consumer device is operative to retrieve a broker fee parameter from the broker device; and include the broker fee in the consumer authorization certificate.

In another embodiment the first access network and interconnect network uses different radio access technologies.

In yet another embodiment the first access network uses any one radio access technology of GSM, UMTS, EDGE, HSPA, LTE and the interconnect network uses any one access technology of WLAN, Bluetooth, ZigBee and IR.

In a yet further embodiment the consumer device is further operative to detect a specific character set of a WLAN SSID thereby indicating data connectivity sharing enablement.

It is an advantage earlier generation devices can use the data services of devices with newer technologies in a secure way.

It is also an environmental advantage that legacy devices can continue to be used.

It is further an advantage that authentication is possible with less user involvement as no specific credit-card, registration, login etc. are required due to that the user is authenticated by the operator's normal 3GPP SIM based mechanisms and a non-intrusive personal experience is thereby made possible.

It yet another advantage that it is made possible to apply rates and charge reliably to a consumer that is using a legacy device and utilizing for example an ad-hoc Wi-Fi tethering through a newer device. A mechanism for the operator to involve and taking a share of a revenue stream for the data sharing is thereby made possible. This is possible without the need for a prior business relation between the broker and the consumer of the service.

Embodiments of the invention will now be described in more detail with reference to the enclosed drawings.

DETAILED DESCRIPTION

The following detailed description of the exemplary embodiments refers to the accompanying drawings. The same reference numbers in different drawings identify the same or similar elements.

A purpose of the invention is to be able to use earlier generation, e.g. non-4G-capable devices for the utilization of new and stable later network access such as 4G through an interconnecting network technology such as a Wi-Fi hotspot shared by a later generation device. In the following, the user of the older device will be referred to as a Consumer, and the enabler of the Wi-Fi hotspot will be referred to as the Broker.

By introducing smart applications on the handsets and allowing these to communicate data to the underlying policy and charging systems it is made possible to authenticate and reliably charge subscribers that are hidden behind a NAT of a Wi-Fi hotspot. In particular, charging of the operators own subscribers are significantly simplified.

The solution makes use of the 3GPP SIM authentication, for example using an inferior bearer network (such as 2G/3G), available on the legacy devices. The way of authenticating the user gives a non-intrusive experience and no other login or registration will be needed. It also gives instant feedback on the cost and price for the usage. Before setting up a Wi-Fi session, the inferior bearer network is used to provide an authentication token, referred to as a Consumer Authorization Certificate (CC) to the application on the consumer side. The CC is used to generate a further authentication token referred to as a Consumer Agreement Certificate (CE). Provided a broker fee is agreed between the consumer and broker, the CE may include a broker fee.

The solution further details a scheme for the transmission, security, session and messaging needed by an Online Charging System (OCS) and a Serving Gateway (SGW) and Packet Data Network Gateway (PGW) in order to achieve a secure and correct charging of the used data transfers. The solution also details how to give a bonus to the broker.

Figure 1:
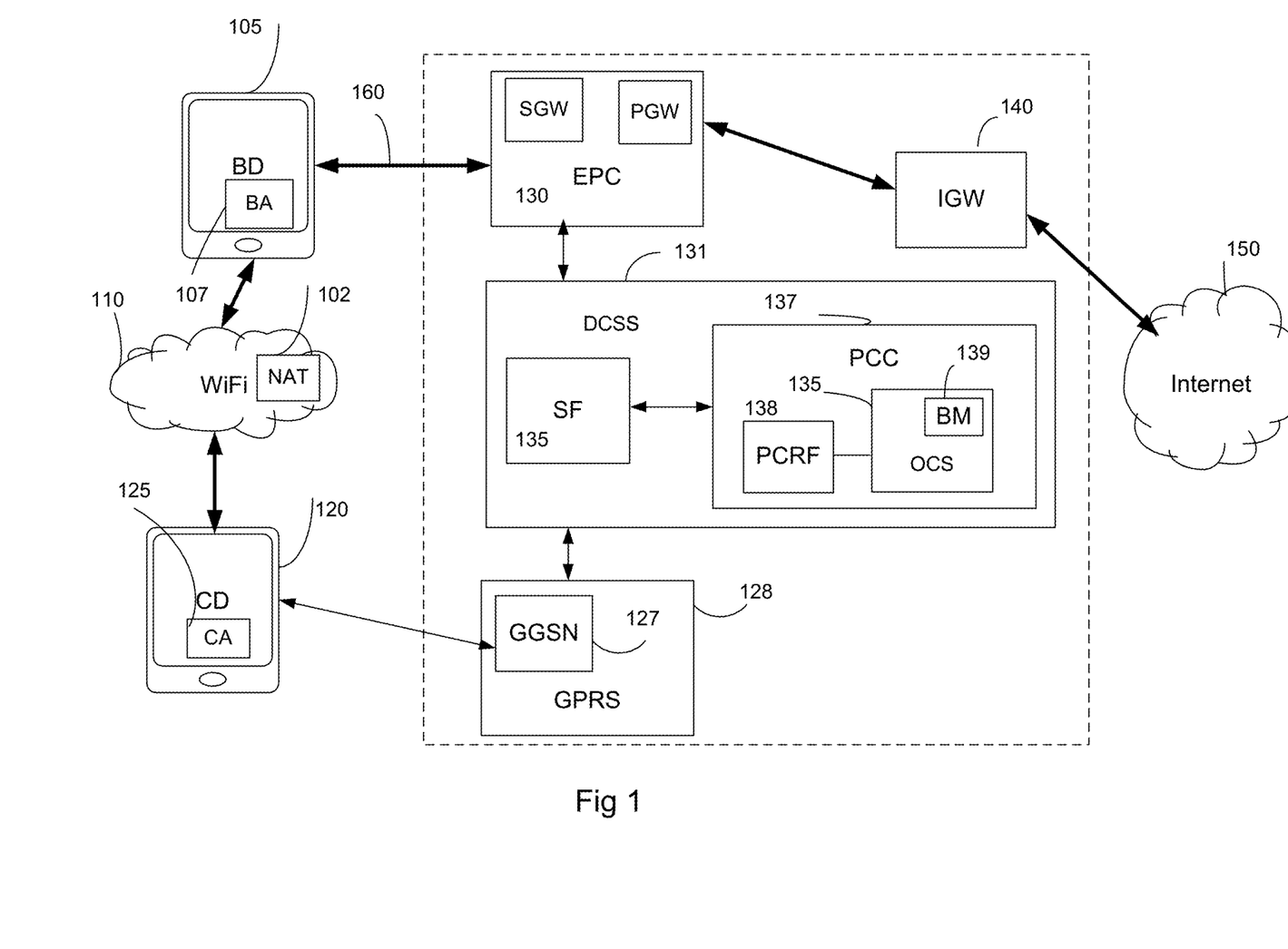
FIG. 1 is a block diagram showing an architecture overview of a system for data connectivity sharing.

FIG. 1 is a block diagram showing an architecture overview of a system for data connectivity sharing.

In one embodiment, the present solution is based on Wi-Fi ad-hoc tethering. This is when a network access is shared through a Wi-Fi enabled device so that it acts as a hotspot server and network (internet) access point, rather than the device only being a client towards the network (internet).

The solution further discloses how a reliable and secure authentication, charging and cost deductions can be achieved on the devices hidden behind the NAT of for example a Wi-Fi access.

The invention focuses on the novel way of authenticating and securely and reliably charging for data enabled subscribers that are hidden behind a NAT 102 of a Wi-Fi network 110 hotspot through tethering. A Consumer Device (CD) 120 including a Consumer Application (BA) 125 hidden behind the Wi-Fi NAT can utilize the benefits of another access network for example a 4G access without having a 4G capable device. The CD is operative to connect to a data connection node such as a Gateway GPRS Support Node (GGSN) 127 of a General Packet Radio Service (GPRS) network 128 of a 3G mobile network.

The access network utilized via the Wi-fi connection to Broker Device (BD) 105 including a Broker Application (BA) 107 may be a later generation mobile network for example 4G. It may also be a network to which the Consumer has no authorized access—such as mobile network or Wi-Fi subscribed to by the broker device. The BD is operative to connect to a data connection node such as a SGW and PGW of an Evolved Packet Core (EPC) 130 of the 4G mobile network.

A Data Connectivity Sharing System (DCSS) 131 is operative to connect to the EPC and to the GPRS. The DCSS includes a Sharing Function (SF) 135 as well a Policy & Charging Control (PCC) subsystem 137. The PCC includes a Policy and Charging Rules Function (PCRF) 138 and an Online Charging System 135 including a Balance Manager (BM) 139.

Authorized user traffic is passed from the PGW via an Internet Gateway (IGW) 140 to the Internet 150.

Figure 2A:
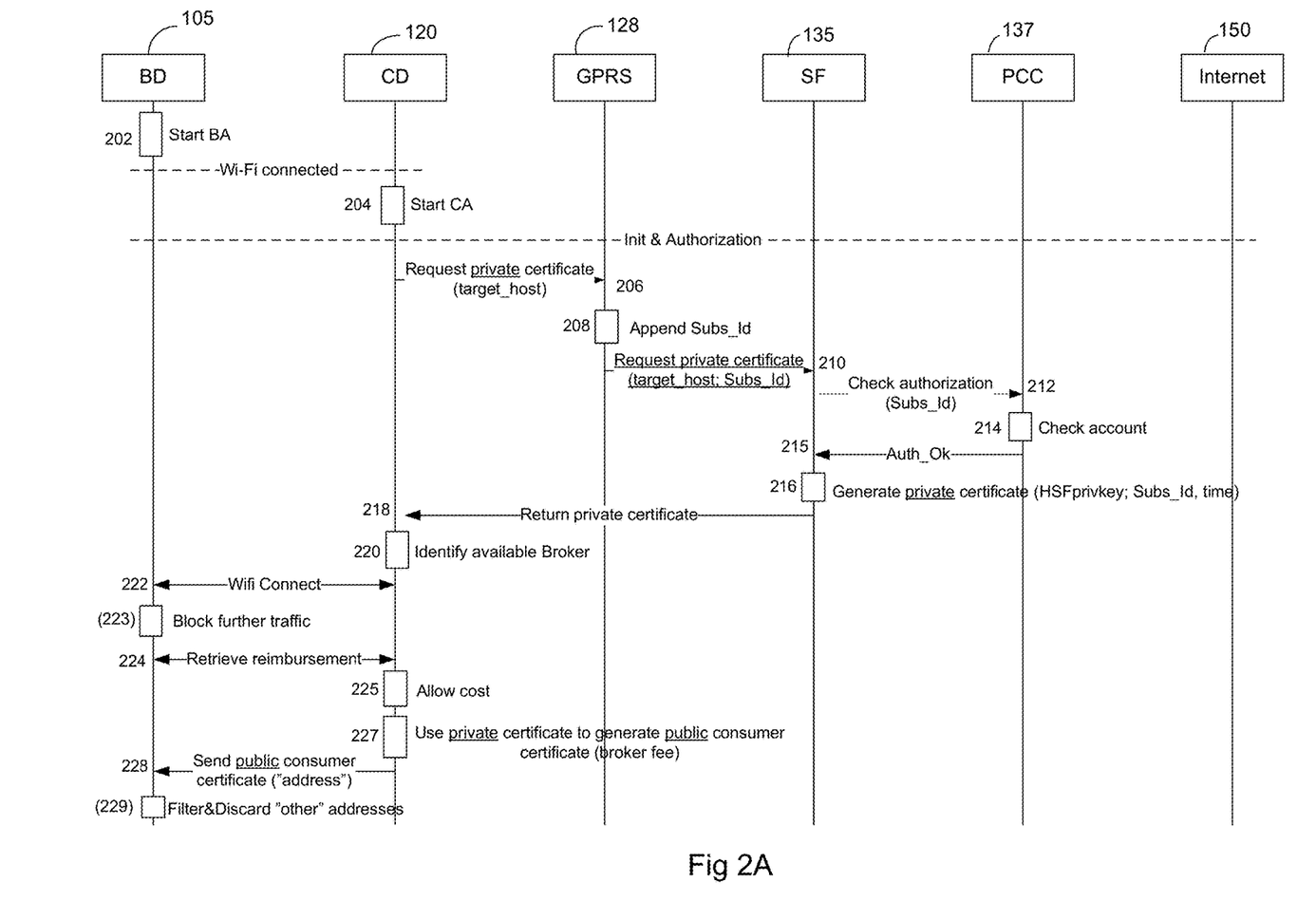
FIGS. 2A-C are message sequence diagrams showing a method for data connectivity sharing according to an example embodiment.
Figure 2B:
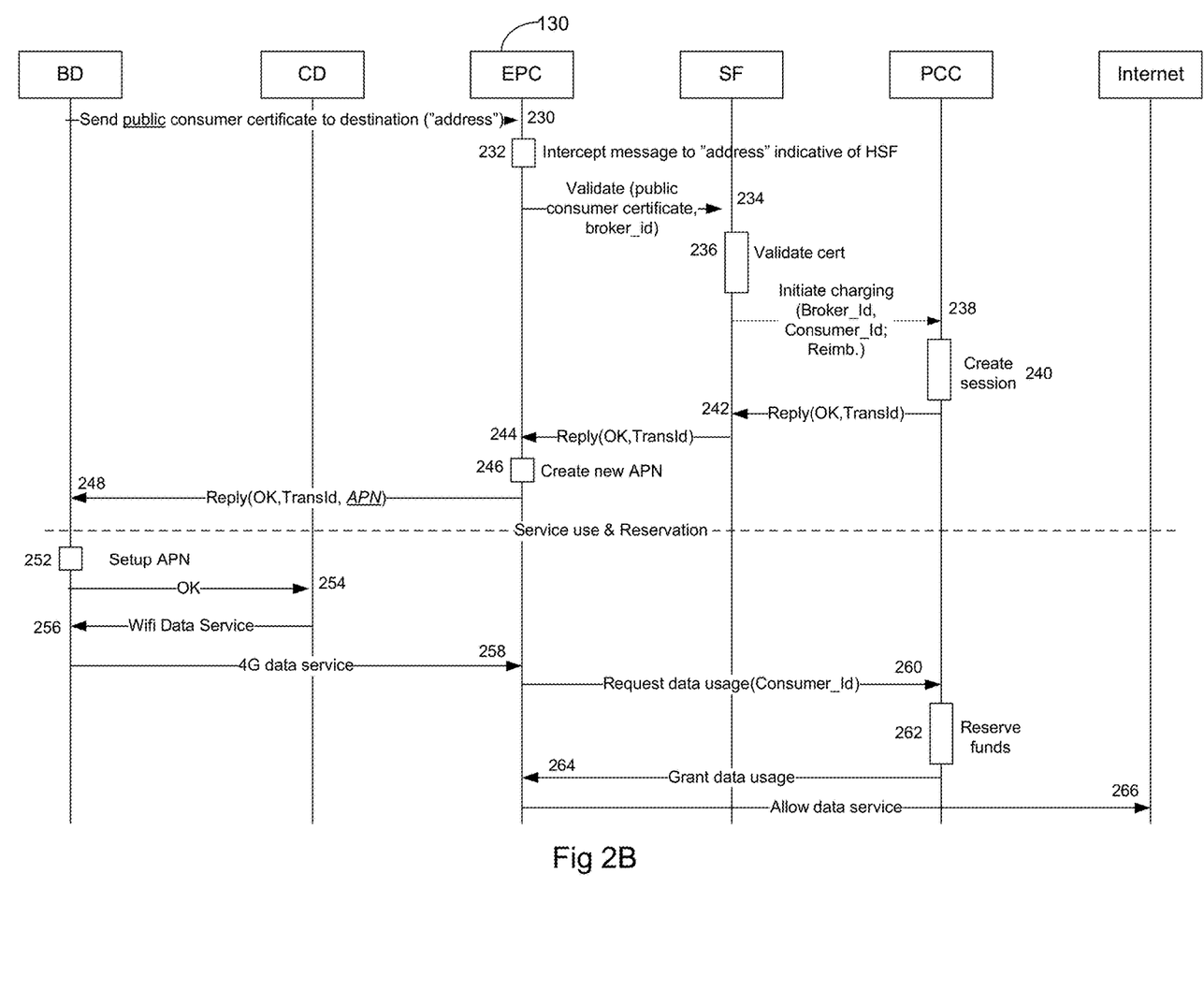
Figure 2C:
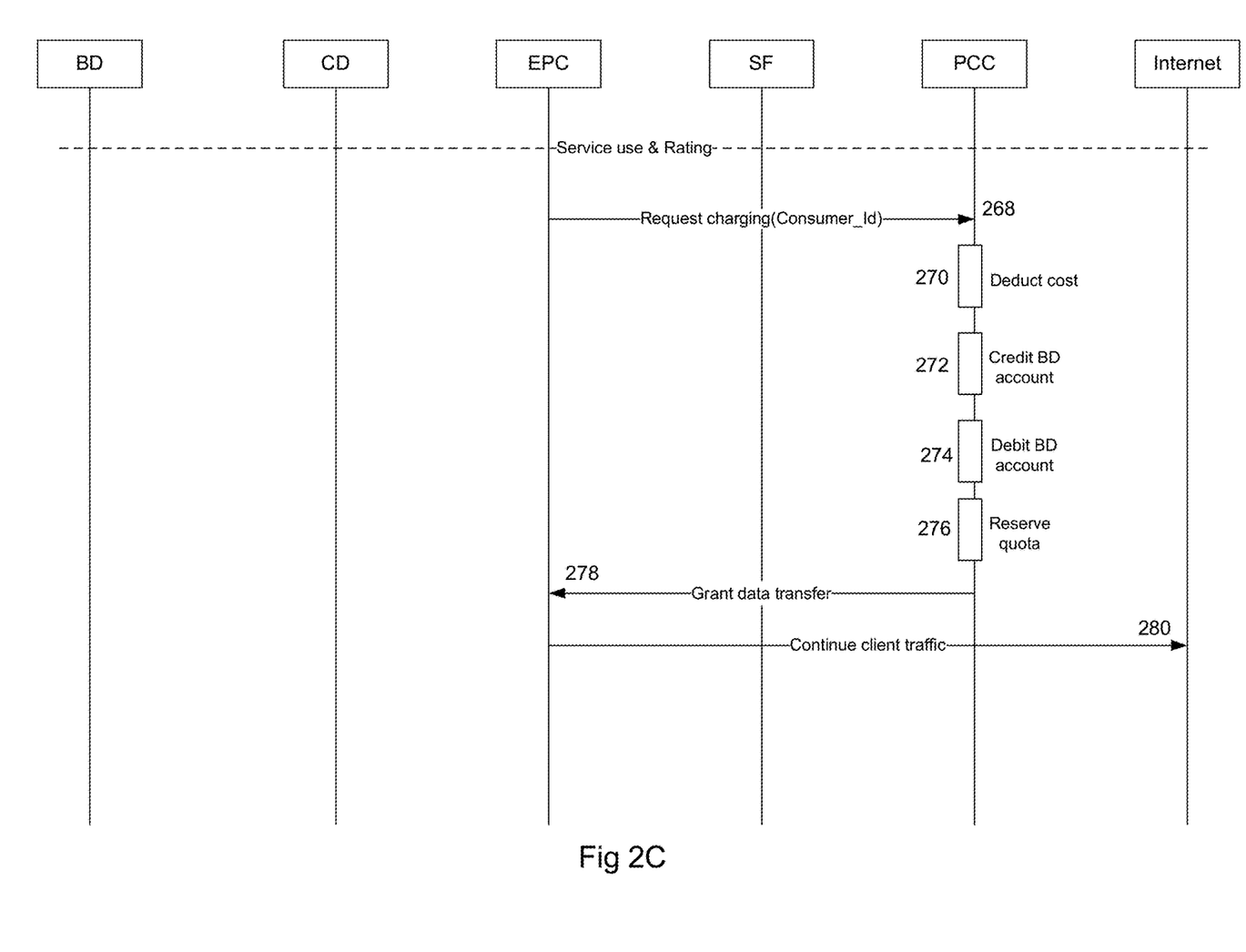

FIG. 2A-C are message sequence charts that describes the nodes, protocols and detailed interaction between the systems in more detail.

A Broker Application (BA) 107 is started on the Broker Device in step 202. Using the BA, the broker may select the reimbursement price that should be applied to the consumer for the service enabling. The broker also has the option to select that no reimbursement should be made, i.e. that no additional charge for the brokering is required by the broker. A Wi-Fi-module on the BD is activated and tethering is initiated whereby the BD acts as Wi-Fi hotspot. A Service Set Identifier (SSID) for the broadcasted Wi-Fi is set by the broker application. The SSID may include a specific prefix indicating the brokering.

A Consumer Application (CA) 125 is started on the consumer Device in step 204. In step 206 the CA uses the existing data access, e.g. 3G, to request a consumer authorization certificate from the operator. The request is sent using HTTP to a specific target host address.

A packet gateway, such as a 3G GPRS Support Node (GGSN) 130 receives the request and filters the specific destination to be handled specially in step 208. This filtering may be made based on the specific target host address which may be identified and intercepted by the GGSN An operator specific subscriber identification (such as MSISDN or other unique identity) is appended to the request. The identification is extracted from the current Packet Data Protocol (PDP) data context. The HTTP request is then forwarded to the SF 135 in step 210.

The SF connects to the PCC in step 212 and authorizes the subscriber by for example checking the available amount of funds for the specific subscriber in step 214. This may be done using any real-time applicable protocol such as Diameter Credit Control (DCC) according to RFC 4006 or 3GPP 32.299. If DCC is used additional policy restrictions and access decisions could be made by a Policy Control Rules Function (PCRF) or equal functionality connected the OCS. This is advantageous when not only the fund balance is needed for access control but also other policy rules. A simpler approach is an administrative balance inquiry providing active balance. Thus, the SF may interact with a PCRF combined with the subscriber information and reply from OCS. A response from the OCS indicating authorization is provided in step 215.

If the response from OCS is OK and the enquired hotspot sharing service is allowed the consumer authorization certificate will be generated using a public-key cryptography standard (PKCS) or a similar public/private key encryption scheme in step 216. For security several encryption schemes may be used, such as Extensible Authentication Protocol-Transport Layer Security (EAP-TLS), defined by IETF in RFC 5216, and Public/Private Key Infrastructure (PM) encryption.

The consumer authorization certificate CC is generated and signed using a private key of the SF and includes the subscriber identification and may also include a timestamp to be used for distinguishing the CC, i.e. $CC=f_{SF_{privatekey}}(SubscriberId;Time)$. As another possible solution, the SF may issue a CA private/public key pair, which may be issued for each session, and include at least the private key for distinguishing the CC and for use by the CA when creating a CE, i.e. $CC=f_{SF_{privatekey}}(SubscriberId;CAPrivateKey)$. The CC is also saved in session memory on the SF using the SubscriberId as an index.

The consumer authorization certificate is returned (through GGSN) to the Consumer Application (CA) in step 218 and saved in memory on the device.

(Note that steps 206-218 will be repeated and re-initiated indefinitely based on a pre-selected time (such as 1h) interval unless step 220 is initiated manually by the Consumer.)

The consumer starts the broker compatible Wi-Fi connection by clicking in the CA in step 220. The application looks at the available Wi-Fi SSIDs and uses a mechanism to determine if any Broker network is within reach. The mechanism for finding a compatible Broker may for example read a common text string prefix included in the SSID, or if the consumer device is more advanced utilizing additional negotiation properties of Hotspot 2.0 (IEEE 802.11u).

In step 222 A Wi-Fi connection is established by connecting the Consumer Device to the Broker Device using normal tethering standards. The Broker application blocks in step 223 all chaining of traffic from the Consumer (or any connected device) until the authenticity is proven (later steps).

If a compatible (broker initiated) Wi-Fi is found an http request is sent by the CA to the BA in step 224 (Wi-Fi gateway IP address) to get the configured price for the session, referred to as the broker fee. The broker fee will be returned by the BA.

If the price is accepted by e.g. an input (click) from the Consumer in step 225 the CA will generate a consumer agreement certificate CE in step 227. This certificate will be cryptographically signed using the private key for the CA issued by the SF and included with the CC that is saved in memory. The CE will also include any agreed broker fee and consumer SubscriberId from the CC. The algorithm for signing may be the Digital Signature Algorithm (DSA) or similar well adopted signing algorithm. Thus, the consumer agreement certificate is generated and signed using the Consumer private key and includes any agreed broker fee and Subscriber Id, i.e. $CE=f_{CAPrivatekey}(BrokerFee:SubscriberId)$. The CA may also use private/public keys issued by an external certificate authority in which case the CA public key must be distributed to the SF. In such case the previously mentioned time stamps may be used for distinguishing authorizations for which the CC and CE is valid.

In step 228 the CA sends the consumer agreement certificate to a specific web address over the newly established Wi-Fi (IP or DNS lookup).

The BA filters (and discards) all traffic with the exception of traffic bound for this address in step 229. The certificate is intercepted by the BA and processed, but the certificate is not routed to the Internet. The processing encompasses retrieving any payload of the message of step 228, including the consumer agreement certificate.

The consumer agreement certificate is sent by the BD to the EPC using HTTP (or other) to a specific pre-defined destination address in step 230. Due to that the BA is the sender; a subsequent response will be addressed to the BA and can thereby be retrieved.

The message including the consumer agreement certificate is intercepted and filtered in step 232 specifically by the routing entity e.g. PGW/SGW based on the specific web address sent to it in step 230.

The EPC will route the consumer agreement certificate to the SF for processing in step 234. More in detail, the routing function will send the consumer agreement certificate to the SF and include the Broker identification (such as MSISDN). This will be done using an administrative interface such as XML or by adapting a special Diameter message to hold the required information including the consumer agreement certificate.

The SF inspects the consumer agreement certificate in step 236 and ascertains that the message is authentic by validation of the signed part of the CE towards the CC saved in memory using the CA public key. The correct CC to match against may be found by matching the Subscriber ID towards the saved certificates in the session memory.

If the certificate is allowed a specific initiation request is sent towards the PCC, for example to the OCS, to start up a Client-Broker relationship and connection for charging in step 238. The request is sent using a normal administrative protocol or an adapted version of a Diameter request. The request contains the unique identification (such as MSISDN or similar) of both the Broker and the Consumer and, if in existence, the broker fee that is extracted from the certificate.

If the Consumer has sufficient credits the OCS or rating function sets up accounts for sharing and/or funds transfer, if applicable, in step 240. The price for the broker fee is also saved in session memory.

The OCS replies to the SF with an OK message in step 242. This is noted and sent on to the routing entity of the EPC (e.g. PGW).

The EPC receives the OK message in step 246 and opens up the possibility to use another Access Point Name (APN) for the Broker device. An alternative would be an alternate Packet Data Protocol (PDP) context. The Consumer id is tagged as connected with the Broker ID using the alternate APN. An example would be that the normal APN is "internet.operator.com", and the second APN would be "internet2.operator.com". The response is then sent back over http to the Broker device including the allocated APN associated with the Consumer traffic in step 248.

In step 252 The BA receives the ok and associates all incoming traffic from the Consumer device to be sent over the new APN that was designated in the response. This includes setting up all IP chaining in the tethering so that incoming traffic from CA is sent through the specific APN. A simple OK response over HTTP is also sent to the CA to confirm a successful establishment of the setup in step 254.

The CA will indicate to the user in step 256 that the session is set up and data transfer from other applications is possible. Any IP enabled service that utilizes the tethering can use Internet access as normally. All connections and data transfer from the Consumer Device will now be using the Wi-Fi connection and be routed through the Broker Handset and Broker Application. At this point the Consumer can initiate any data transmitting activity such as browsing the internet or streaming TV. The CA monitors the bandwidth usage, consumption and monitors how much data that is used.

In step 258 data packages sent from the Consumer device are routed directly to the specifically assigned APN for this shared connection; the APN to use is determined by the Broker Application.

The EPC will receive the data at the new APN/PDP Context and an initial authorization will be send to the PCC in step 260. If charging is done also a reservation will be sent to the OCS, in step 260. The message will be modified by EPC, e.g. PGW, to include the Consumer Identification (MSISDN) in a predetermined field of the Diameter message (for example reference point Gy between a Policy & Charging Enforcement Function of the EPC). The consumer identification will be retrieved from session memory by looking at the specific APN coupled with the broker identity.

The OCS will receive the Gy reservation and a credit reservation will be made to the Consumer Identity connected Account to cover the cost of the coming charging interval in step 262. This includes operator data costs and any reimbursement to the Broker. The rules for selecting an amount and determining the service policy such as bandwidth and Quality of Service (QoS) are also possible to affect. If the service is subsidized by the Broker a reservation will be made to the Broker account as well.

In step 264 an OK response will be sent back to the EPC, e.g. PGW, in case there is sufficient credits on the consumer account to start up the service.

In step 266 the EPC, e.g. PGW, allows the data to be started as normally for a data session by answering back to the network. This will in effect open up and allow data transfer services from the Consumer Device to the Internet, routed via the Broker Device.

In step 268 the EPC, e.g. PGW, monitors the session and waits until a full charging interval is reached before making a charge.

Further, in step 268, when a charging interval is about to be passed for the Consumer based on the monitored traffic, EPC (e.g. PGW) sends a charging request towards the OCS (on Gy). The Diameter message includes the Consumer identification (e.g. MSISDN)) of the consumer associated with the traffic.

The OCS receives the Gy request in step 270 and the used data traffic is charged to the Consumer account according to the determined price for the used data.

If a reimbursement (kickback of broker fee) has been agreed a transaction of credits for the agreed price will be made from the Consumer Account to the Broker Account in step 272.

The Broker Account is debited in step 274 in case the service is subsidized by the broker. This means that the Broker account will also be debited in addition to the Consumer account.

In step 276 the OCS makes a new reservation for the next charging interval similar to step 262.

In step 278 a response is sent to the EPC (e.g. PGW) to grant traffic and continue session.

The EPC allows further traffic and data service consumption in step 280. When the next charging interval is reached a start-over from step 268 is performed.

Figure 3:
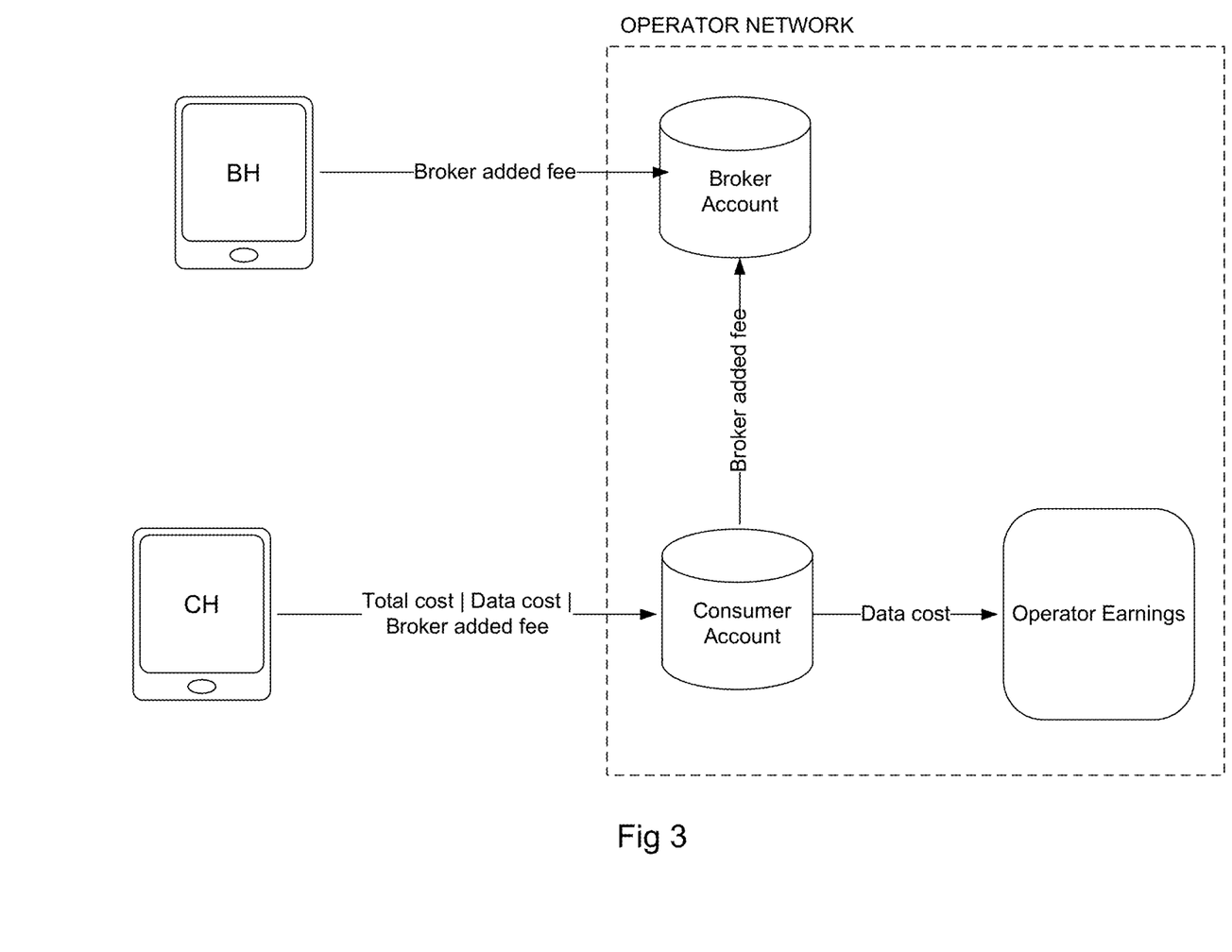
FIG. 3 is a block diagram showing an example value flow for a transaction using embodiments of the invention.

FIG. 3 is a block diagram showing an example value flow for a transaction using embodiments of the invention.

Figure 4A:
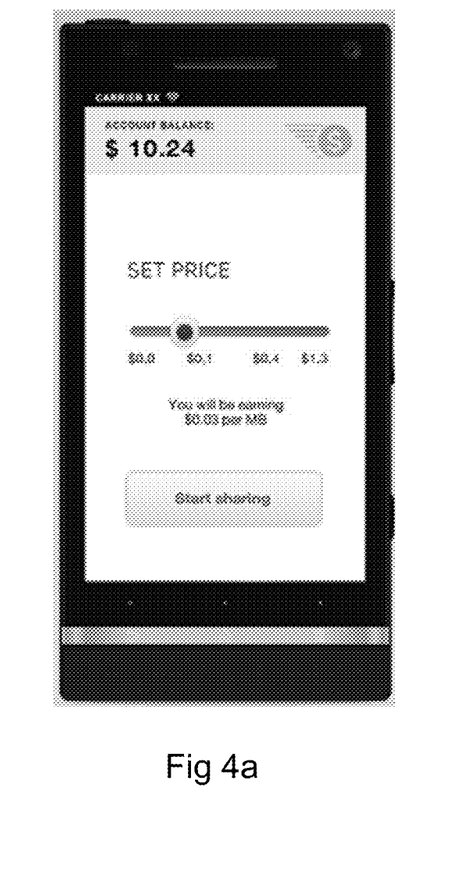
FIGS. 4a-c shows example user interfaces for a device using example embodiments of the invention.
Figure 4B:
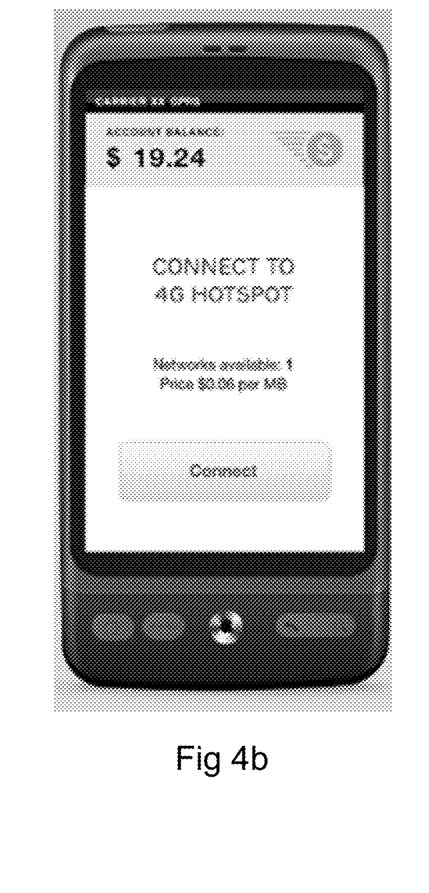
Figure 4C:
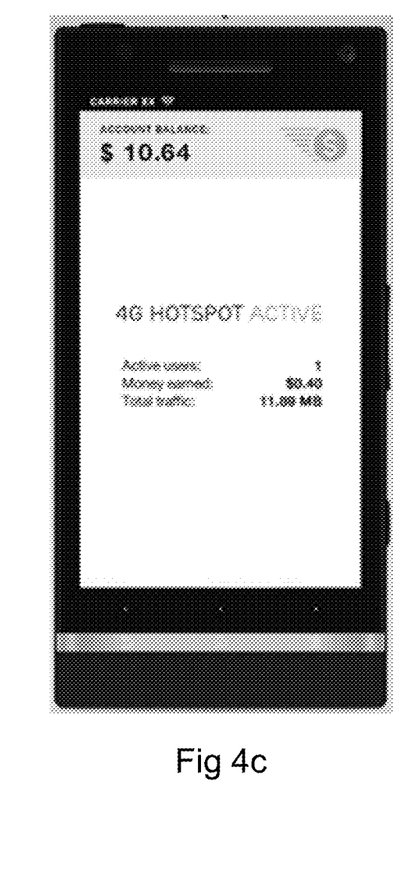

FIG. 4A-C is an example of a possible visualization of the User applications on both the broker and the consumer side. Please not that these are examples and not the only possible alternatives.

FIG. 4A is an example of the Broker Application GUI when the application is just started. The slider indicates the Broker reimbursement selection option. If the slider would be moved to a negative value (not shown in the figure) this would allow for a Broker subsidized transaction. FIG. 4B is an example of the screen shown to the consumer before connecting. The price per megabyte or the service cost is shown before accepting to start the service. FIG. 4C is an example of the Broker application view when the consumer is using the service. Real time value is displayed.

Figure 5:
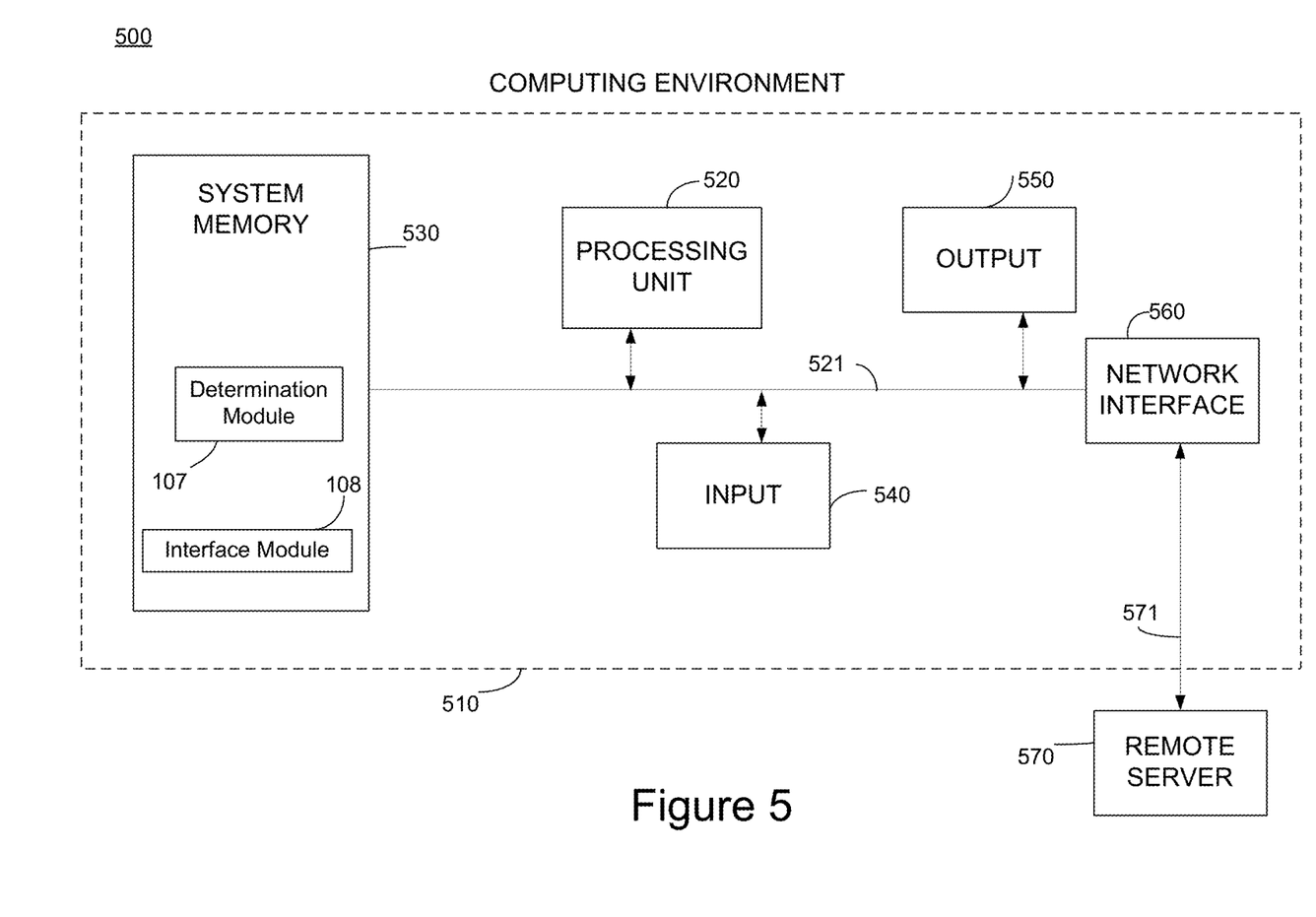
FIG. 5 is a block diagram showing an exemplary embodiment of a data connectivity sharing node, broker device or consumer device in the form of computing system environment.

FIG. 5 below is a block diagram showing an exemplary embodiment of a node, consumer device or broker device according to the disclosed solution in the form of computing system environment 500.

Although as made clear above, the computing system environment 500 is only one example of a suitable computing environment for a node, consumer device or broker device and is not intended to suggest any limitation as to the scope of use or functionality of the claimed subject matter. Further, the computing environment 500 is not intended to suggest any dependency or requirement relating to the claimed subject matter and any one or combination of components illustrated in the example operating environment 500.

An example of a device for implementing the previously described innovation includes a general purpose computing device in the form of a computer 510. Components of computer 510 can include, but are not limited to, a processing unit 520, a system memory 530, and a system bus 521 that couples various system components including the system memory to the processing unit 520. The system bus 521 can be any of several types of bus structures including a memory bus or memory controller, a peripheral bus, and a local bus using any of a variety of bus architectures.

Computer 510 can include a variety of transitory and non-transitory computer readable media. Computer readable media can be any available media that can be accessed by computer 510. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 510. Communication media can embody computer readable instructions, data structures, program modules or other data in a modulated data signal such as a carrier wave or other transport mechanism and can include any suitable information delivery media.

The system memory 530 can include computer storage media in the form of volatile and/or nonvolatile memory such as read only memory (ROM) and/or random access memory (RAM). A basic input/output system (BIOS), containing the basic routines that help to transfer information between elements within computer 510, such as during start-up, can be stored in memory 530. Memory 530 can also contain data and/or program modules that are immediately accessible to and/or presently being operated on by processing unit 520. By way of non-limiting example, memory 530 can also include an operating system, application programs, other program modules, and program data.

The system memory 530 may include an Execution Unit 580 as a software module loaded in the memory and processable by the processing unit, or other circuitry, adapting the computer for performing the steps of the node, consumer device or broker device according to the disclosed solution.

For example, the execution unit may be adapting the computer 510 into a node, for enabling sharing data connectivity between a consumer device and a broker device, comprising a processor and a memory, said memory containing instructions executable by said processor whereby said node is operative to:
  receive from a first packet routing node a request for a consumer authorization certificate, the request including a subscriber identity;
  based on the subscriber identity authorize the subscriber for sharing data connectivity;
  generate a consumer authorization certificate using a private encryption key associated with the node, said consumer authorization certificate including the subscriber identity of the subscriber;
  return the consumer authorization certificate to the first packet routing node; —receive a request for a data connectivity service for the subscriber from a second packet routing node, the request comprising a consumer agreement certificate and a broker identity, said consumer agreement certificate signed using a private key associated with the subscriber and including the subscriber identity; and
  validate the consumer agreement certificate; —send a confirmation message to the second packet routing node.

In another example, the execution unit may be adapting the computer 510 into a broker device comprising a processor and a memory, said memory containing instructions executable by said processor, the broker device connected to a data network using a first access network for sharing data connectivity with a consumer device connected to the first communication device over an interconnect network, whereby said broker device is operative to:
  receive a consumer agreement certificate over the interconnect network;
  determine a destination address for the consumer agreement certificate;
  send the consumer agreement certificate to the destination address over the first access network;
  receive a confirmation message including the communication path identifier identifying a communication path over the first access network; and
  in response to the confirmation message allow data transmission between the data network and the consumer device using the identified communication path.

In yet another example, the execution unit may be adapting the computer 510 into a consumer device comprising a processor and a memory, said memory containing instructions executable by said processor, the consumer device connected to a data network using a first access network for sharing data connectivity with a broker device connected to the first communication device over an interconnect network, wherein the consumer application is operative to:
  send a request for a consumer authorization certificate to a first pack node over the first access network;
  receive the consumer authorization certificate from the first pack node over the first access network;
  identify an available broker device;
  generate a consumer agreement certificate;
  send the consumer agreement certificate to the broker device over the interconnect network; and
  initiate data transmission between the first and second communications device over the interconnect network.

The computer 510 can also include other removable/non-removable and volatile/nonvolatile computer storage media. For example, computer 510 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 521 through a non-removable memory interface such as an interface, and a magnetic disk drive or optical disk drive can be connected to the system bus 521 by a removable memory interface, such as an interface.

A user can enter commands and information into the computer 510 through input devices such as a keyboard or a pointing device such as a mouse, trackball, touch pad, and/or other pointing device. Other input devices can include a microphone, joystick, game pad, satellite dish, scanner, or similar devices. These and/or other input devices can be connected to the processing unit 520 through user input 540 and associated interface(s) that are coupled to the system bus 521, but can be connected by other interface and bus structures, such as a parallel port, game port or a universal serial bus (USB).

A graphics subsystem can also be connected to the system bus 521. In addition, a monitor or other type of display device can be connected to the system bus 521 through an interface, such as output interface 550, which can in turn communicate with video memory. In addition to a monitor, computers can also include other peripheral output devices, such as speakers and/or printing devices, which can also be connected through output interface 550.

The computer 510 can operate in a networked or distributed environment using logical connections to one or more other remote computers, such as remote server 570, which can in turn have media capabilities different from device 510. The remote server 570 can be a personal computer, a server, a router, a network PC, a peer device or other common network node, and/or any other remote media consumption or transmission device, and can include any or all of the elements described above relative to the computer 510. The logical connections depicted in FIG. 5 include a network 571, such as a local area network (LAN) or a wide area network (WAN), but can also include other networks/buses.

When used in a LAN networking environment, the computer 510 is connected to the LAN 571 through a network interface or adapter. When used in a WAN networking environment, the computer 510 can include a communications component, such as a modem, or other means for establishing communications over a WAN, such as the Internet. A communications component, such as a modem, which can be internal or external, can be connected to the system bus 521 through the user input interface at input 540 and/or other appropriate mechanism.

In a networked environment, program modules depicted relative to the computer 510, or portions thereof, can be stored in a remote memory storage device. It should be noted that the network connections shown and described are exemplary and other means of establishing a communications link between the computers can be used.

Additionally, it should be noted that as used in this application, terms such as "component," "display," "interface," and other similar terms are intended to refer to a computing device, either hardware, a combination of hardware and software, software, or software in execution as applied to a computing device. For example, a component may be, but is not limited to being, a process running on a processor, a processor, an object, an executable, a thread of execution, a program and a computing device. As an example, both an application running on a computing device and the computing device can be components. One or more components can reside within a process and/or thread of execution and a component can be localized on one computing device and/or distributed between two or more computing devices, and/or communicatively connected modules. Further, it should be noted that as used in this application, terms such as "system user," "user," and similar terms are intended to refer to the person operating the computing device referenced above.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various exemplary combinations and subcombinations of embodiments and of the manner and process of making and using them, and shall support claims to any such combination or subcombination.

Many variations and modifications can be made to the embodiments without substantially departing from the principles of the present solution. All such variations and modifications are intended to be included herein within the scope of the present solution.

The invention claimed is:

1. A method performed by a broker application at a first communication device connected to a data network using a first access network for sharing data connectivity with a second communications device connected to the first communication device over an interconnect network, comprising the broker application performing the steps of:
   determining a broker fee and providing the broker fee to the second communications device over the interconnect network, wherein the interconnect network uses any one access technology of WLAN (wireless area network), Bluetooth, Zigbee, and IR (infared);
   receiving a consumer agreement certificate over the interconnect network;
   determining a destination address for the consumer agreement certificate;
   sending the consumer agreement certificate to the destination address over the first access network, wherein the first access network uses any one radio access technology of GSM (global system for mobile communications, UMTS (universal mobile telecommunications system), EDGE (Enhanced Data rates for GSM Evolution), HSPA (high speed packet access), and LTE (long term evolution);
   receiving a confirmation message including a communication path identifier identifying a communication path over the first access network via the interconnect network; and
   in response to the confirmation message, allowing data transmission between the data network and the second communications device using the communication path identified.

2. The method according to claim 1 wherein the first access network and the interconnect network uses different radio access technologies.

3. The method according to claim 1 wherein the communication path identifier is an access point name (APN) or a packet data protocol (PDP) Context.

4. A broker device comprising a processor and a memory, said memory containing instructions executable by said processor, the broker device connected to a data network using a first access network for sharing data connectivity with a consumer device connected to a first communication device over an interconnect network, whereby said broker device is operative to:
   determine a broker fee and provide the broker fee to the second communications device over the interconnect network, wherein the interconnect network uses any one access technology of WLAN (wireless area network), Bluetooth, Zigbee, and IR (infared);
   receive a consumer agreement certificate over the interconnect network;
   determine a destination address for the consumer agreement certificate;
   send the consumer agreement certificate to the destination address over the first access network, wherein the first access network uses any one radio access technology of GSM (global system for mobile communications, UMTS (universal mobile telecommunications system), EDGE (Enhanced Data rates for GSM Evolution), HSPA (high speed packet access), and LTE (long term evolution);
   receive a confirmation message including a communication path identifier identifying a communication path over the first access network via the interconnect network; and
   in response to the confirmation message, allow data transmission between the data network and the consumer device using the communication path identified.

5. The broker device according to claim 4 wherein the first access network and the interconnect network uses different radio access technologies.

6. The broker device according to claim 4 wherein the communication path identifier is an access point name (APN) or a packet data protocol (PDP) Context.

7. The method according to claim 1 wherein the interconnect network comprises a Wi-Fi network.

8. The method according to claim 1 wherein the first access network comprises a first radio access technology, RAT, network.

9. The method according to claim 1 wherein the consumer agreement certificate is generated and signed using a consumer private key associated with the second communications device and comprises an agreed upon broker fee and a subscriber identifier.

10. The method according to claim 1 wherein the second communications device is hidden behind a network address translation, NAT, and the communication path identified comprises a communication path from/to the second communications device behind the NAT through the interconnect network and the first communication device to/from the first access network.

11. The broker device according to claim 4 wherein the interconnect network comprises a Wi-Fi network.

12. The broker device according to claim 4 wherein the first access network comprises a first radio access technology, RAT, network.

13. The broker device according to claim 4 wherein the consumer agreement certificate is generated and signed using a consumer private key associated with the consumer device and comprises an agreed upon broker fee and a subscriber identifier.

14. The broker device according to claim 4 wherein the consumer device is hidden behind a network address translation, NAT, and the communication path identified comprises a communication path from/to the consumer device behind the NAT through the interconnect network and the first communication device to/from the first access network.

* * * * *